UNITED STATES PATENT OFFICE.

GAIL BORDEN, OF WHITE PLAINS, AND JOHN G. BORDEN, OF SOUTH EAST, NEW YORK.

IMPROVEMENT IN CONDENSED MILK.

Specification forming part of Letters Patent No. 144,311, dated November 4, 1873; application filed October 30, 1873.

*To all whom it may concern:*

Be it known that we, GAIL BORDEN, of White Plains, in the county of Westchester, in the State of New York, and JOHN G. BORDEN, of South East, in the county of Putnam and State aforesaid, have discovered and invented a new and useful Manufacture or Product, namely, Condensed Milk, that will keep sound and continue in a state of preservation without the use of sugar, or any antiseptic or other foreign substance; and we do declare that the following is a full, clear, and exact description of the same, and of the process or operation by which it is produced.

We are aware that a patent was granted for producing concentrated sweet milk by evaporation *in vacuo*, the same having no sugar or other foreign matter mixed with it; but the milk thus concentrated was not thereby rendered preservative, and would not remain in a sound condition any considerable time.

Heretofore milk to be condensed and preserved has only been brought to a boiling-heat, which has been found amply sufficient to fit the fluid milk for evaporation *in vacuo;* and it has heretofore been found necessary, in order to preserve the milk when condensed, to combine sugar with it during the process of condensation; but, for the purpose referred to in this specification, we place the milk in any suitable closed vessel, and heat the same under a pressure to such a degree of temperature—above 212° Fahrenheit—as will destroy the germs of putrescence, or any element or property in milk promoting or tending to fermentation, putrefaction, or decomposition. The milk thus treated is then let into a vacuum-pan and condensed in the ordinary way, and then put into cans, and hermetically sealed by usual and well-known methods.

The article we produce, herein described, is pure milk, so acted upon by heat as to be freed from the elements or property leading to fermentation, putrescence, or decomposition, and condensed in the usual way.

A suitable process for producing this product, as above described, forms the subject of an application of even date with this; but any other equivalent process may be employed.

We claim—

The manufacture or product of condensed milk, rendered preservative by heating the milk under pressure to a degree above the boiling-point, or above 212° Fahrenheit, by the process and operation, and substantially as herein set forth.

GAIL BORDEN.
JOHN G. BORDEN.

Witnesses:
HAROLD A. BAGLEY,
J. HENRY KEENE.